(12) United States Patent
Martin et al.

(10) Patent No.: US 7,929,960 B2
(45) Date of Patent: Apr. 19, 2011

(54) SYSTEM AND METHOD FOR CONTROLLING DEVICE USAGE

(75) Inventors: Daryl J. Martin, Paradise (CA); Ahmed E. Hassan, Waterloo (CA); John F. (Sean) Wilson, Waterloo (CA)

(73) Assignee: Research In Motion Limited, Waterloo (CA)

( * ) Notice: Subject to any disclaimer, the term of this patent is extended or adjusted under 35 U.S.C. 154(b) by 801 days.

(21) Appl. No.: 11/402,839

(22) Filed: Apr. 13, 2006

(65) Prior Publication Data

US 2007/0245026 A1 Oct. 18, 2007

(51) Int. Cl.
*H04M 1/66* (2006.01)
*H04M 3/16* (2006.01)
*H04M 3/38* (2006.01)

(52) U.S. Cl. ..................... 455/419; 455/456.3

(58) Field of Classification Search .................. 455/419
See application file for complete search history.

(56) References Cited

U.S. PATENT DOCUMENTS

| | | | |
|---|---|---|---|
| 6,317,593 B1 * | 11/2001 | Vossler | 455/414.1 |
| 6,587,876 B1 | 7/2003 | Mahon et al. | |
| 6,831,970 B1 * | 12/2004 | Awada et al. | 379/201.01 |
| 7,197,321 B2 * | 3/2007 | Erskine et al. | 455/456.1 |
| 7,324,473 B2 * | 1/2008 | Corneille et al. | 370/328 |
| 2003/0017821 A1 * | 1/2003 | Irvin | 455/410 |
| 2003/0023453 A1 * | 1/2003 | Hafen et al. | 705/1 |
| 2004/0166878 A1 * | 8/2004 | Erskine et al. | 455/456.1 |
| 2004/0203686 A1 * | 10/2004 | Bahr | 455/418 |
| 2004/0203895 A1 * | 10/2004 | Balasuriya | 455/456.1 |
| 2005/0043014 A1 * | 2/2005 | Hodge | 455/411 |
| 2006/0046706 A1 * | 3/2006 | Lin et al. | 455/420 |
| 2006/0141985 A1 | 6/2006 | Patel et al. | |
| 2006/0160562 A1 * | 7/2006 | Davis et al. | 455/550.1 |
| 2007/0004386 A1 * | 1/2007 | Singh et al. | 455/414.1 |

FOREIGN PATENT DOCUMENTS

| | | |
|---|---|---|
| GB | 2408174 A | 5/2005 |
| JP | 2001320453 A | 11/2001 |

* cited by examiner

*Primary Examiner* — Nick Corsaro
*Assistant Examiner* — Frank Donado
(74) *Attorney, Agent, or Firm* — Brett J. Slaney; Blake, Cassels & Graydon LLP

(57) ABSTRACT

Mobile device usage may be monitored and restricted by pushing enabling/disabling events from an administrator the device. The events impose a certain set of rules that can "lock" certain features provided by the device, according to permissions and pre-established policies, for a certain period of time. Such restricted periods may coincide with meetings or other events in which distractions should be kept to a minimum. Preferably, the rules include conditional locks that allow a user to use a feature a reasonable number of times before the lock is activated to require the user to minimize such distractions, while enabling the user to maintain access to such a vital communication tool. Cancel packets may also be used to not only control but to monitor the application of the rule sets and when certain conditions are breaches, which provides an employer with sufficient information to use in auditing device usage or in reprimanding users for misuse of a privilege such as the use of mobile data communications devices.

24 Claims, 10 Drawing Sheets

SYSTEM AND METHOD FOR CONTROLLING DEVICE USAGE

TECHNICAL FIELD

The following relates to systems and methods for controlling device usage.

DESCRIPTION OF THE PRIOR ART

Mobile device usage has become widespread amongst both individuals and corporations, and often such users rely heavily, and may even become dependent on, the use of such devices. Mobile devices are often used to conduct business, maintain contact with peers and perform other communication tasks while the user of the device is away from their home or office. Due to their ubiquity, mobile devices, in particular the usage of the devices, have been viewed by many as an interruption to public environments, such as corporate meetings, movie theatres, and public transit.

In particular, mobile devices have been known to cause interruptions and distractions in a corporate meeting environment, most notably where there are several attendees. For example, in a large meeting, mobile device users may send messages to each other, respond to emails, play games, and even answer telephone calls. Often a presenter or facilitator of such meetings may be distracted by these activities, which can have a negative influence on a presentation, and may cause a user who is participating in the distracting activity to miss or overlook an important point in the presentation.

In certain scenarios, users do not intend on creating a distraction but merely forget to turn off or silence their device prior to arriving at a meeting. A buzzing or ringing caused by receipt of a message or telephone call could then inadvertently occur which serves to both embarrass the user and possibly result in undesirable consequences.

It is therefore an object of the following to obviate or mitigate at least one of the above disadvantages.

BRIEF DESCRIPTION OF THE DRAWINGS

Embodiments will now be described by way of example only with reference to the appended drawings wherein.

DETAILED DESCRIPTION OF THE DRAWINGS

Figure 1:
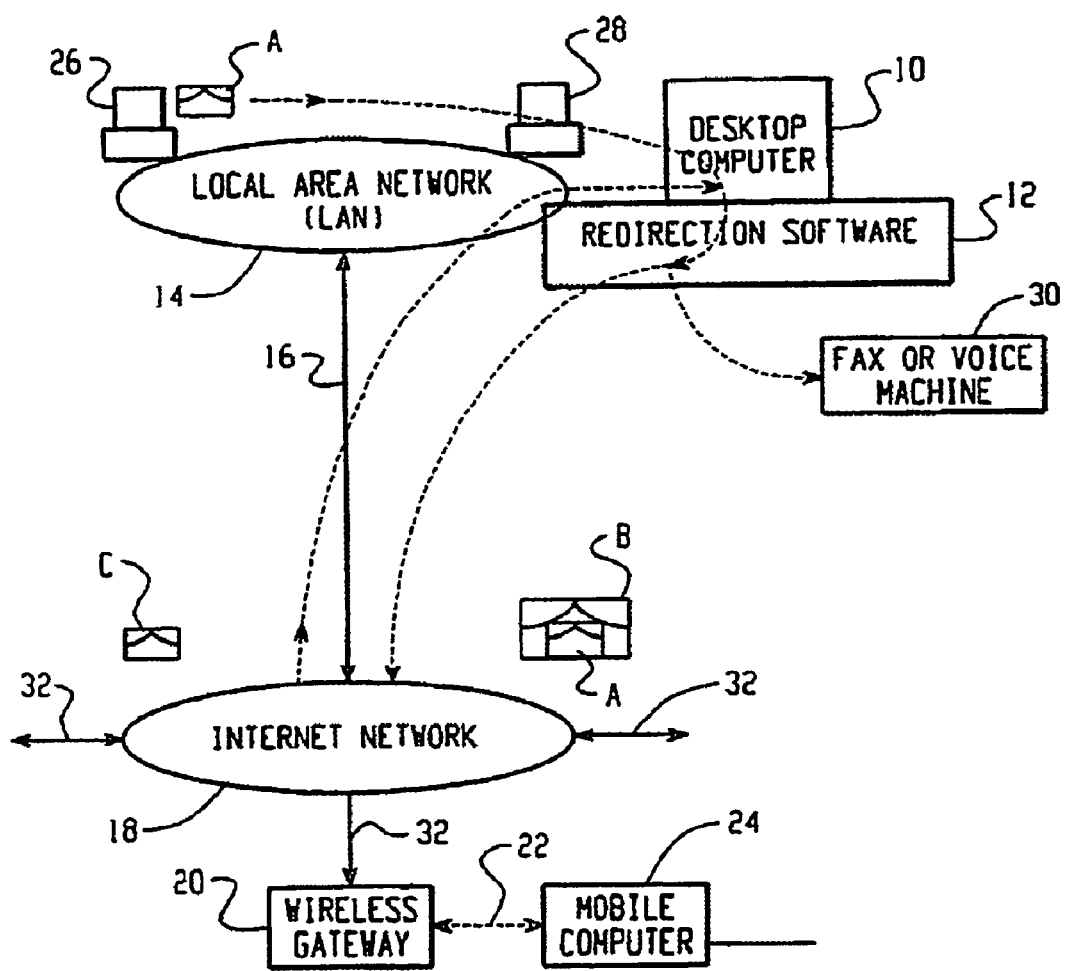
FIG. 1 is a system diagram showing the redirection of user data items from a user's desktop PC (host system) to the user's mobile data communication device, where the redirector software is operating at the user's desktop PC.

Referring now to the drawings, FIG. 1 is an exemplary system diagram showing the redirection of user data items (such as message A or C) from a user's office PC (host system) 10 to the user's mobile data communication device 24, where the redirector software 12 is operating at the user's PC. Message A in FIG. 1 represents an internal message sent from desktop 26 to the user's host system 10 via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video) or a machine capable of processing and playing audio files, such as a voice mail system. The system shown includes the ability to redirect certain message attachments to such an external machine 30 if the redirector program configuration data reflects that the mobile device 24 cannot receive and process the attachments, or if the user has specified that certain attachments are not to be forwarded to mobile device 24, even if such device can process those attachments. By way of example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the internet and to send the audio clip to the user's voice mail system. This example is not intended to limit the breadth and scope of the present teachings, but rather to illustrate the variety of possibilities embodied in the redirection concept.

Figure 4:
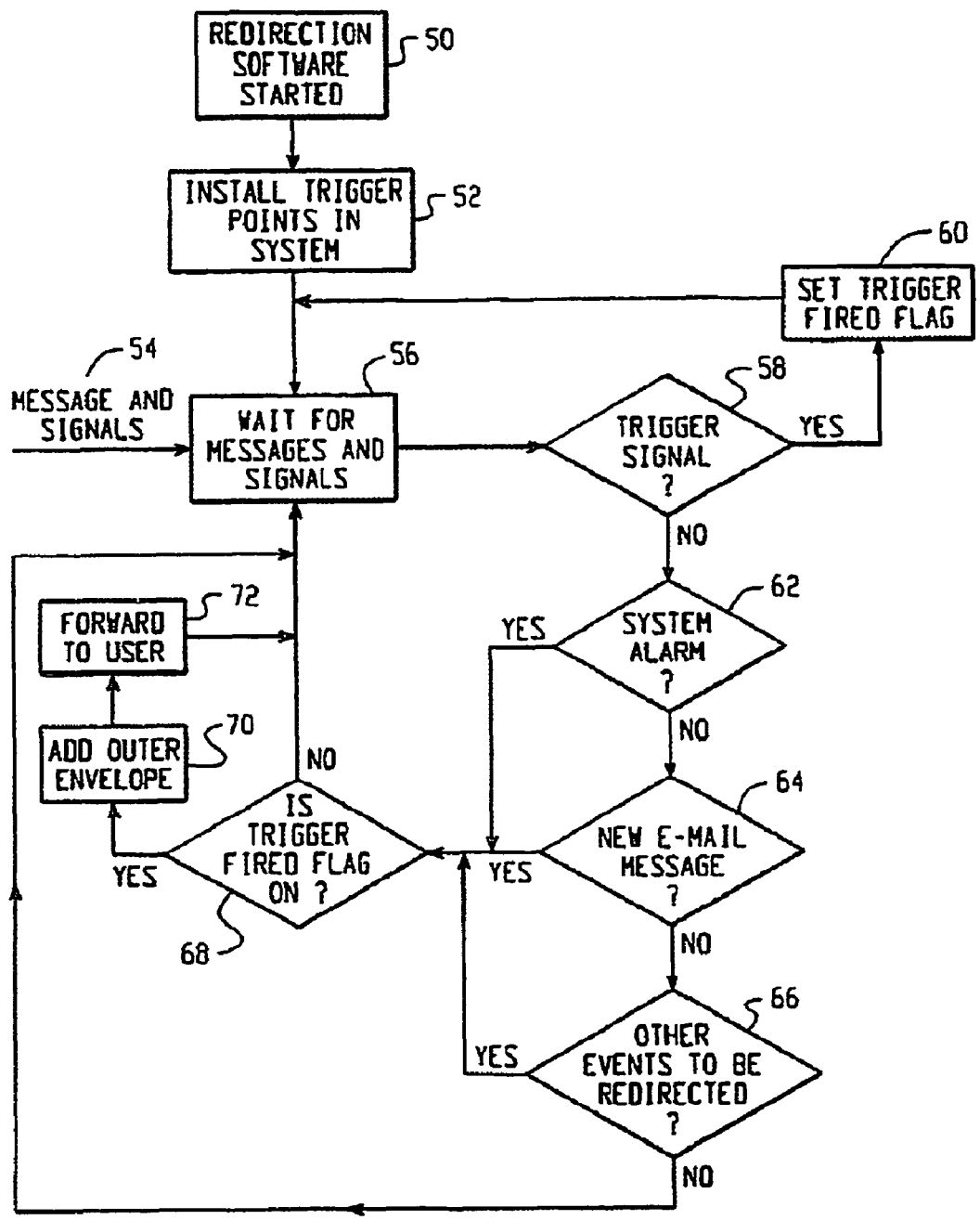
FIG. 4 is a flow chart showing the steps carried out by the redirector software operating at the host system.

The preferred mobile data communication device 24 is a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the system shown could be beneficially used in a "one and one-half" or acknowledgment paging environment, or even with a one-way paging system. The mobile data communication device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

In an alternative embodiment, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1-4.

A user can configure the redirector program 12 to push certain user-selected data items to the user's mobile data communication device 24 when the redirector 12 detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

Among the user-defined event triggers that can be detected by the redirector program 12 are, in the preferred embodiment, external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer, and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. The preferred method of detecting new messages is using Microsoft's® Messaging API (MAPI), in which programs, such as the redirector program 12, register for notifications or 'advise syncs' when changes to a mailbox take place. Other methods of detecting new messages could also be used.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message for redirection, the redirector program 12 could compress the original message A, could compress the message header, or could encrypt the entire message A to create a secure link to the mobile device 24.

Also programmed into the redirector 12 is the address of the user's mobile data communication device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30.

The redirector may also be programmed with a preferred list mode that is configured by the user either at the host system 10, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can then send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the software 12 then sends the message A to a secondary memory store located in the mobile device 24, using whatever means are necessary. In the preferred embodiment this method is to send the message A back over the LAN 14, WAN 18, and through the wireless gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the mobile computer 24 appears to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment this results in the outgoing redirected message from the user's host system 10 being sent using the E-mail address of the host mailbox, rather than the address of the mobile device, so that it appears to the recipient of the message that the message originated from the user's desktop system 10 rather than the mobile data communication device. Any replies to the redirected message will then be sent to the desktop system 10, which if it is still in redirector mode, will repackage the reply and resend it to the user's mobile data device, as described above.

Figure 2:
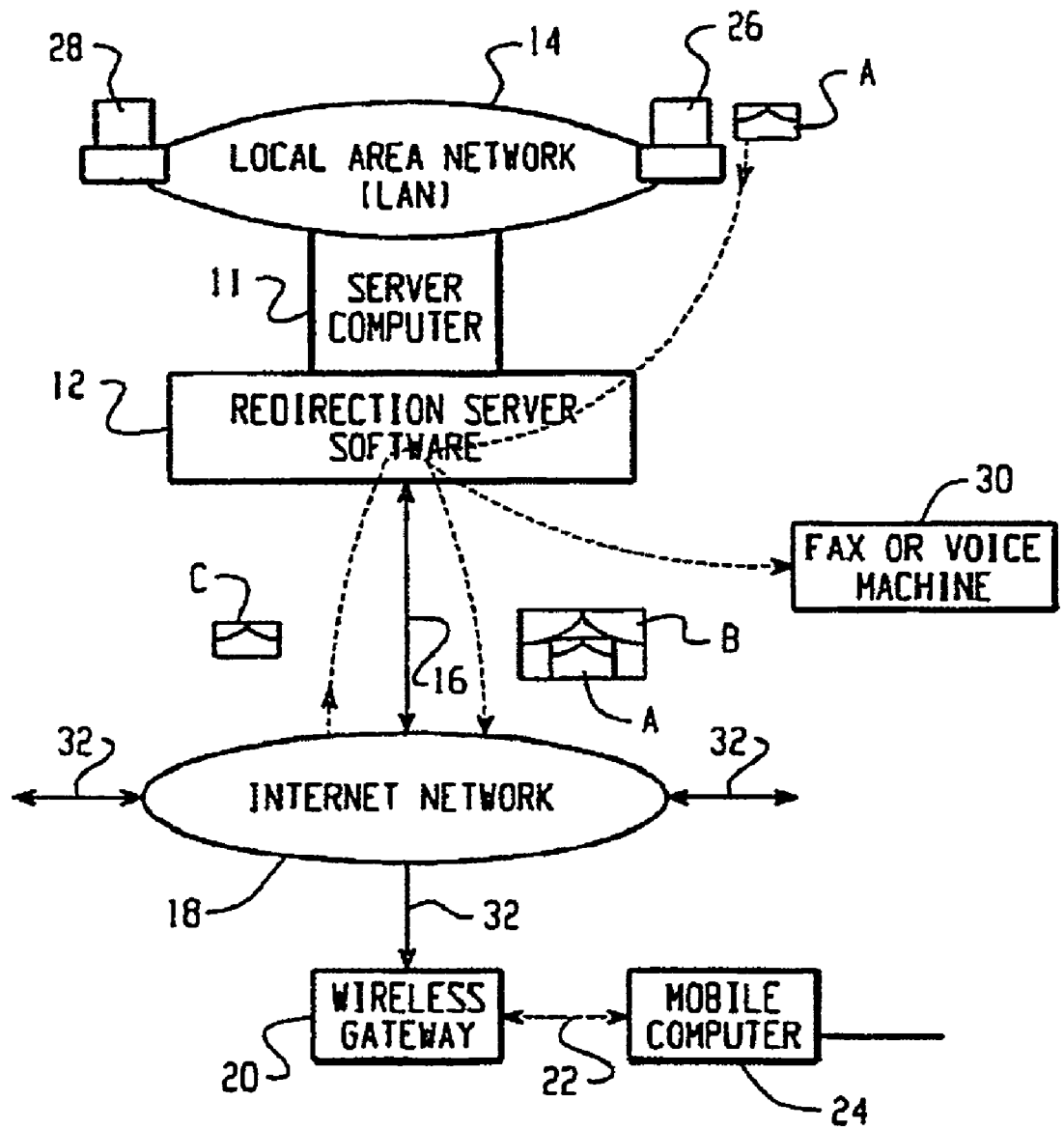
FIG. 2 is a system diagram showing the redirection of user data items from a network server (host system) to the user's mobile data communication device, where the redirector software is operating at the server.

FIG. 2 is an alternative system diagram showing the redirection of user data items from a network server 11 to the user's mobile data communication device 24, where the redirector software 12 is operating at the server 11. This configuration is particularly advantageous for use with message servers such as Microsoft's® Exchange Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 10, 26, 28, including information such as whether a particular user can have data items redirected, which types of message and information to redirect, what events will trigger redirection, the address of the users' mobile data communication device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile data communication device 24, or it could be a message from an external computer, such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
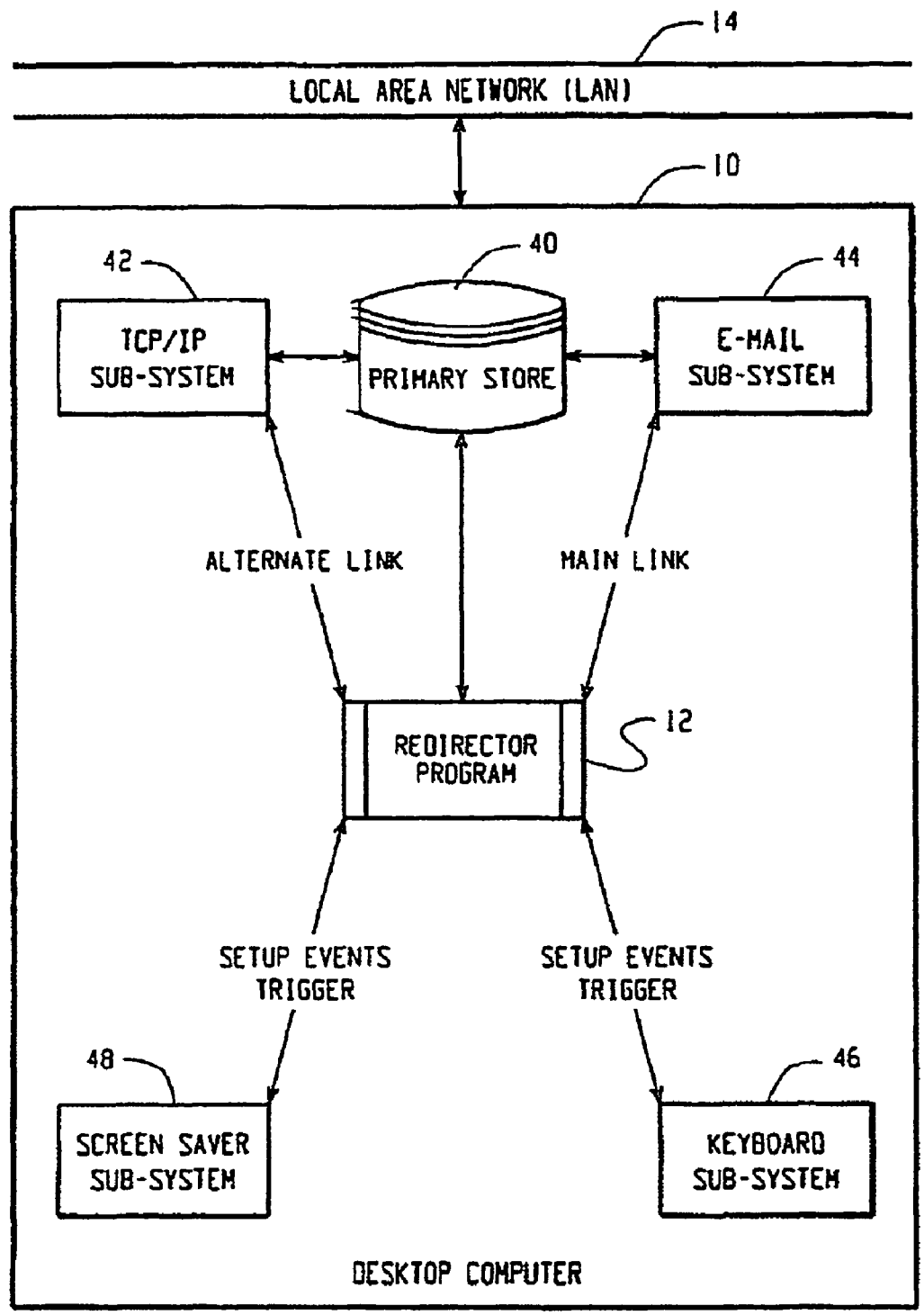
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12 with additional components of the host system 10 of FIG. 1 (the desktop PC) to enable more fully the pushing of information from the host system 10 to the user's mobile data communication device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve transparency, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile data communication device; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10.

In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, the system can be triggered to begin redirection upon detecting numerous external, internal and networked events, or trigger points. Examples of external events include: receiving a command message from the user's mobile data communication device 24 to begin redirection; receiving a similar message from some external computer, sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start the redirection process. For example, the screen saver system can be configured so that when the screen saver is activated, after, for example, ten (10) minutes of inactivity on the desktop system, an event trigger is transmitted to the redirector 12, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10 that can be used to generate internal event triggers.

Figure 5:
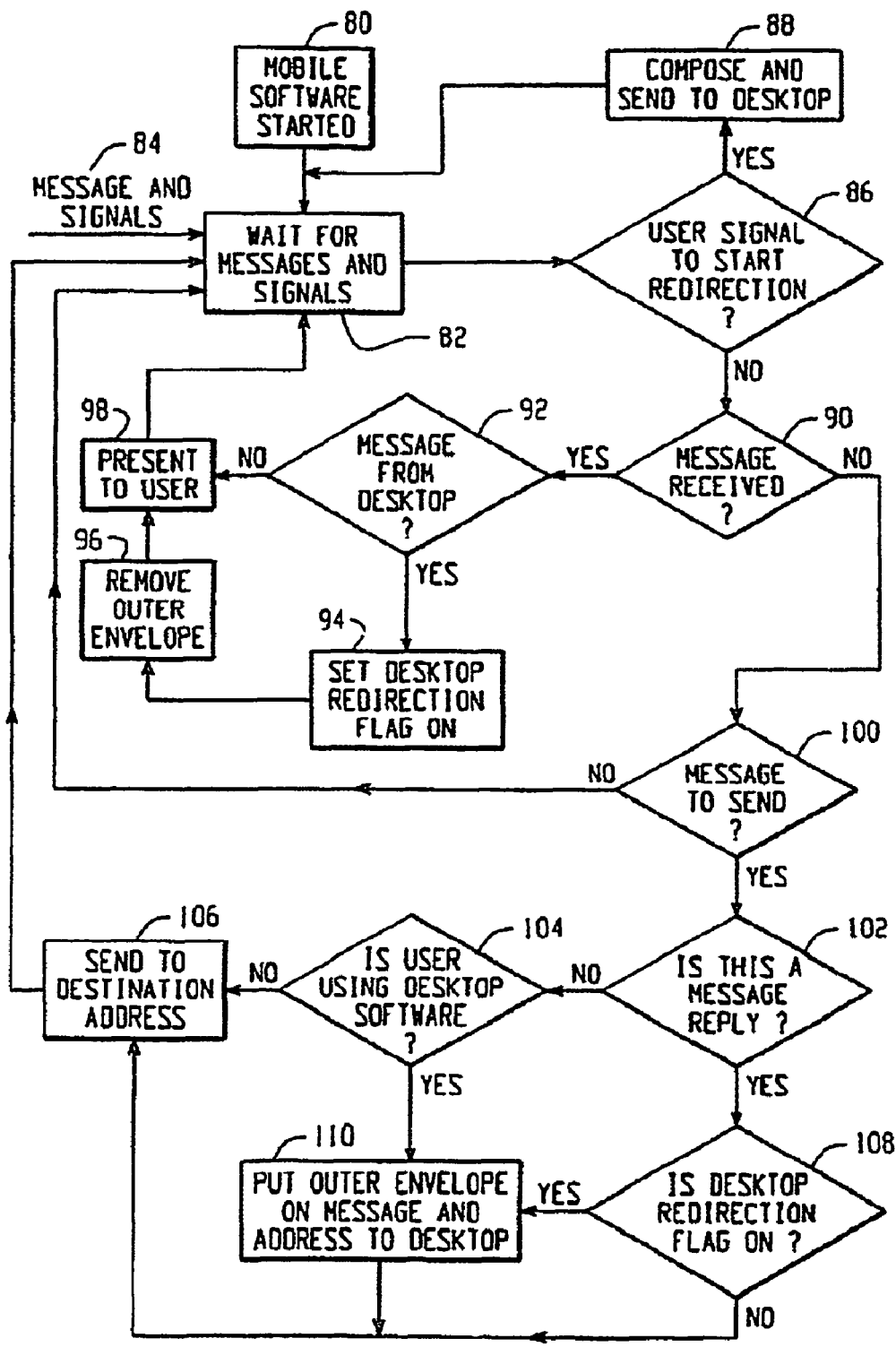
FIG. 5 is a flow chart showing the steps carried out by the mobile data communication device to interface with the redirector software operating at the host system.

FIGS. 4 and 5, set forth, respectively, flow charts showing the steps carried out by the redirector software 12 operating at the host system 10, and the steps carried out by the mobile data communication device 24 in order to interface with the host system. Turning first to FIG. 4, at step 50, the redirector program 12 is started and initially configured The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device.

Once the redirector program is configured 50, the trigger points (or event triggers) are enabled at step 52. The program 12 then waits 56 for messages and signals 54 to begin the redirection process. A message could be an E-Mail message or some other user data item that may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages)

that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag is set, then at step 70, the redirector 12 causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender is on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12. At step 80 the mobile software is started and the mobile device 24 is configured to operate with the system, including, for example, storing the address of the user's desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86, the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine 10. In this situation where the mobile device 24 is sending a message directly to the desktop system 10, no outer wrapper is added to the message (such as message C in FIGS. 1 and 2). In addition to the redirection signal, the mobile device 24 could transmit any number of other commands to control the operation of the host system, and in particular the redirector program 12. For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is repackaged with the outer envelope having the addressing information of the user's desktop system 10, and the repackaged message is then transmitted to the desktop system 10 at step 106. As described above, the redirector program 12 executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If, however, the mobile determines that the user is using the redirector software 12 at the desktop system 10, then control passes to step 110, where the outer envelope is added to the message. The repackaged original message is then transmitted to the desktop system 10 at step 106, which, as described previously, strips the outer envelope and routes the message to the correct destination. Following transmission of the message at step 106, control of the mobile returns to step 82 and waits for additional messages or signals.

Systems such as that described above with respect to FIGS. 1-5 often include mobile devices 24 that are purchased, distributed, and administered by an employer, for certain of their employees, as both a communication tool and/or as an incentive. Consequently, in such scenarios, the end user of the device 24 is not the sole owner of the device and, the employer typically has at least some discretion to control usage of the devices which have been purchased for their employees, most notably during working hours.

Figure 6:
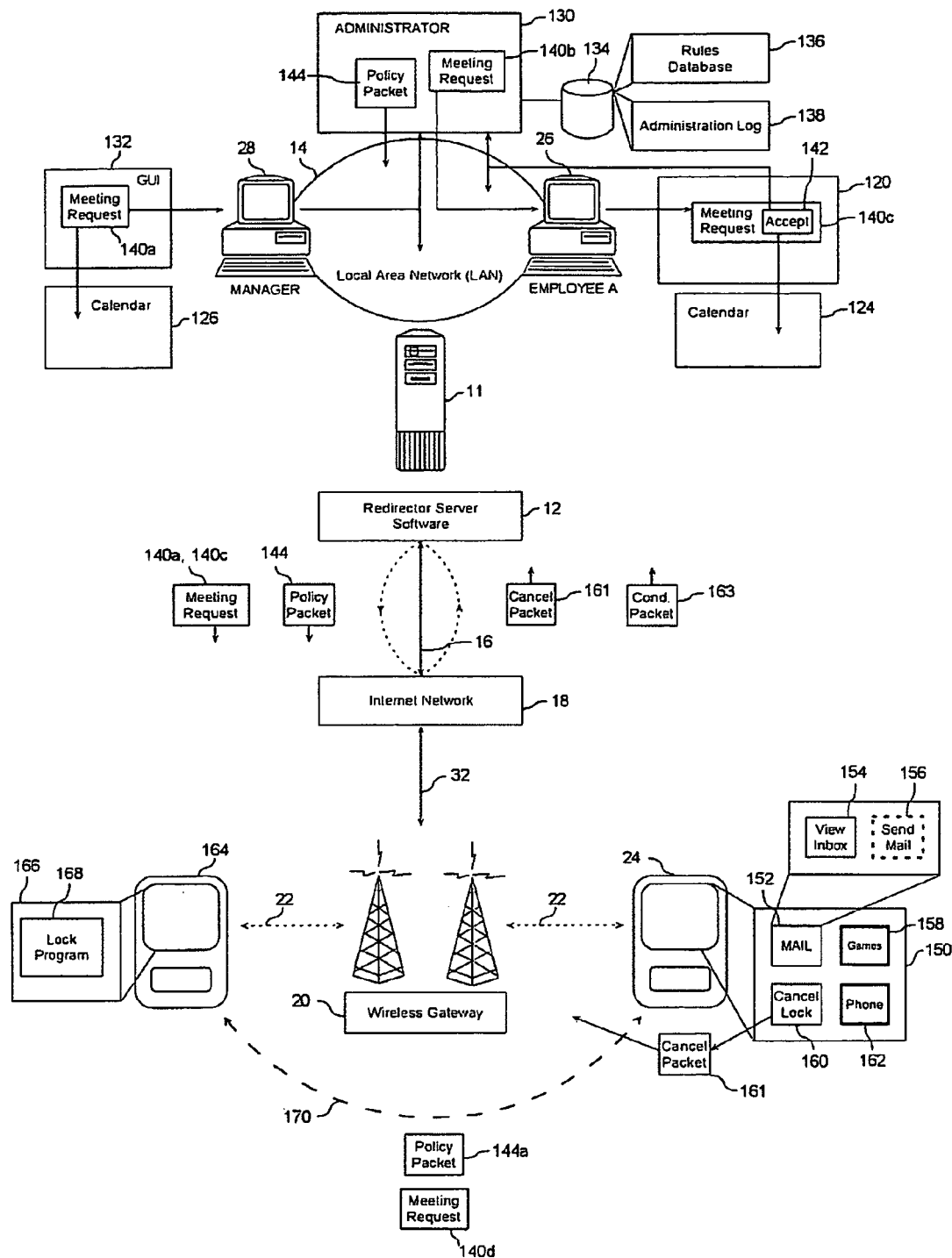
FIG. 6 is a block diagram showing an embodiment of a system for controlling mobile device usage.

FIG. 6 shows a schematic diagram of one example of a system for monitoring and controlling mobile device usage. In the example of FIG. 6, desktop computer 28 is utilized by a first employee who wishes to schedule a meeting with a second employee, the second employee utilizing desktop 26. It will be appreciated that the example provided herein for scheduling a meeting using desktops 26 and 28 is purely for illustrative purposes only. For example, a meeting may also be scheduled between a wireless device and desktop, e.g., device 164 and desktop 26; between wireless devices, e.g., between devices 24 and 164; between a desktop and a device, e.g. desktop 28 and device 24, etc. As such, it will be understood that the principles described above in conjunction with FIGS. 1-5 may be used to schedule meetings with or without accessing a desktop computer.

In this example, the first employee associated with desktop computer 28 has at least some authority over the second employee associated with desktop computer 26, e.g. supervisor, manager, senior partner, etc. The first employee associated with desktop computer 28 will hereinafter be referred to as a "Manager" and the second employee associated with desktop computer 26 will hereinafter be referred to as "Employee A". Desktops 28, 26 are connected to LAN 14 as described above. The Manager has a first mobile communications device 164 and Employee A has a second mobile communications device 24. It will be appreciated that in this example, both of the Manager and Employee A are employed by the same entity (not shown) and this entity has at least some discretion as to the usage of the devices 24, 164. In this first example, data items are redirected between the desktops 26, 28 and devices 24, 164 respectively through the server 11, redirector software 12, network 18 and gateway 20, using the principles outlined above in conjunction with FIGS. 1-5. It will be appreciated that, in another example (described below), data items can also be sent locally between devices (e.g. devices 24 and 164), in real-time; without utilizing the server 11, software 12, network 18 and gateway 20.

Employee A has a mail program running on desktop computer 26, which includes an inbox 120 for sending, receiving and viewing mail and other data items, and a calendar 124 for storing, viewing and organizing appointments and events. The Manager also has a calendar 126, and it will be appreciated that although not shown in FIG. 6, the Manager has a mail program similar to Employee A, including an inbox (not shown). Such a mail program is typically provided by the employing entity in which case it runs from a server (e.g. server 11) on the LAN 14. In one example, the Manager interacts with a graphical user interface (GUI) 132 is displayed on desktop 28 for generating a meeting request 140a that includes rules for controlling the usage of Employee A's device 24 by initiating a lock to inhibit features or services provided by device 24 such as phone, email, games etc. It will be appreciated that a meeting request 140a may alternatively be generated using mobile device 164 (or device 24). GUI 132 is typically a network administered program that runs on a server (e.g. server 11) connected to the LAN 14, and is accessible to the Manager and Employee A over the LAN 14.

Also connected to the LAN 14 is an administrator 130. The administrator 130 may be used to monitor and control usage of the devices 24, 164 by initiating a lock to inhibit selected ones of features or services provided by devices 24, 164. The administrator 130 includes a data storage device 134 that stores a rules database 136 and an administration log 138. The administrator 130 may alternatively take the form of a program running from any one or all of the desktops 26, 28 and devices 24, 164. In this alternative, the log 138 includes messages that are sent to a meeting coordinator (e.g. Manager) so that they can track device usage without relying on an administrator such as administrator 130. In this example, administrator 130 is shown as a separate entity to illustrate tasks for which it may be responsible.

The rules database 136 contains rule sets corresponding to selected features that are to be locked, permissions defining other users whose devices can be locked, and time/date information related to meetings or other restricted period for employees of the employing entity such as the Manager and Employee A. The time/date information includes a list of restricted periods that correspond to time periods during which certain features or services provided by the devices 24, 164, are to be disabled, restricted or locked (i.e. inhibited), e.g. during scheduled meetings. The administration log 138 contains time and date information related to such restricted periods and whether or not the rule sets have been complied with by certain employees. The information contained in the administration log 138, when available, is analyzed to enable the administrator 130 or other interested party to monitor the usage of the features or services intended to be locked on the devices 24, 164 during the restricted periods. The administrator 130 initiates the lock for inhibiting features of the devices 24, 164 by pushing policies, in this example policy packets 144, thereto. In general, policy packets 144 include data structures that include enabling/disabling events, and these data structures can alter device configuration to enable and disable features of the devices 24, 164.

As also shown by way of example in FIG. 6, the device 24 includes a display interface 150 for displaying icons enabling a user to select various device features. In FIG. 6, the device 24 provides a mail program 152, a games option 158, an optional cancel lock feature 160 for manually disabling rules imposed by policy packet 144, and a telephone feature 162. The mail program 152 includes an inbox 154 for viewing mail items, and a send mail option 156 for composing and sending mail items.

If Employee A chooses to select the cancel lock option 160, they are preferably presented with a confirmation dialog (not shown) requesting final confirmation that they wish to disable the administrator imposed lock. In FIG. 6, the games option 158 and phone option 162 icons are highlighted, indicating that a lock has been placed on those features, and thus they cannot be used whilst the lock is active. For example, a lock on the phone would typically at least inhibit the device from ringing when an incoming call is received, and may also completely inhibit use of the phone for a restricted period of time. The send mail option 156 is highlighted with a broken border indicating that a conditional lock is being imposed on this feature. A conditional lock allows a user to use this option only a particular, predetermined number of times or under certain conditions. Typically, if this predetermined amount of usage is exceeded, the option is then locked as will be explained in greater detail below.

The cancel lock option 160 may be configured to only apply to certain features, such as email. For example, a default locking rule may be imposed on the device 24 that forbids Employee A to be able to cancel a lock inhibiting the play of games on the device 24 during a meeting. Such a default locking rule can be imposed at the employing entity's discretion. In another example, the device 24 may be initially configured to have a back-up default lock that will automatically trigger when a meeting starts and especially in the case where a policy packet 144 has not been sent.

For example, an employee (not shown) enters a meeting without having any prior meeting details. In this case, another attendee (e.g. Employee A) sends meeting details directly to the new attendee via link 170 (explained below), which would then initiate the default locking rules for the new attendee's device (not shown). This option allows for certain features, e.g. games, to be locked in every meeting, whether or not the particular attendee has previously entered the meeting information into their device 24 or desktop 26. In addition, a location sensing device included in a mobile device, such as a global positioning system (GPS) or radio frequency (RF) identification (ID) can also be used to determine when a mobile device has entered a "meeting zone", which would then automatically trigger the default lock. Therefore, at the employer's discretion, any set of rule guidelines can be implemented to suit their needs or corporate policies.

The devices 24, 164 typically include a direct, non-network supported link 170 between each other, such as a WiFi, Bluetooth or Infrared (IR) link. In another example described in greater detail below, the link 170 is also used to apply a lock, particularly when access to the wireless gateway 20 is limited or non-existent or to intentionally impose rules for limiting or disabling features of another user's device in real-time. For example, a meeting room below ground may temporarily inhibit the devices 24, 164 from communicating with the wireless gateway 20. In this scenario, the policy packets 144 typically cannot reach the devices 24, 164. Alternatively, the Manager may wish to invoke a locally generated policy packet 144a in real time to lock device 24 during the meeting, in order to disable devices that are being used and have since become a distraction. Policy packet 144a is generated by a lock program 168 accessible through interface 166 provided by device 164. The lock program 168 either pushes a policy packet 144a directly to Employee A, or broadcasts packet 144a within a particular area, thereby locking any device that is being used within that area. It will be appreciated that such options are at the discretion of the employing entity and are typically monitored and controlled by the administrator 130, and would be subject to pre-established permissions and policies.

As shown in FIG. 6, the Manager may schedule a meeting using device 164, producing a meeting request 144d that can be sent directly to device 24 over link 170. The link 170 is particularly useful for scheduling meetings and forwarding policies (e.g. policy packet 144a) during a meeting, or to impose additional rules etc. in real time. For example, a meeting request 140a may be initially generated without imposing any rules. At some other time, or even during the meeting, the Manager may wish to change, update, add or remove certain rules for locking certain devices. Moreover, the Manager can first schedule a meeting and then delegate the responsibility of applying a lock to another employee, e.g. a meeting coordinator or secretary. Therefore, any device used by any entity can be suitably adapted for sending policy packets, e.g. over link 170, in order to restrict or disable features of the device 24 and need not rely on an administrator 130.

Figure 7:
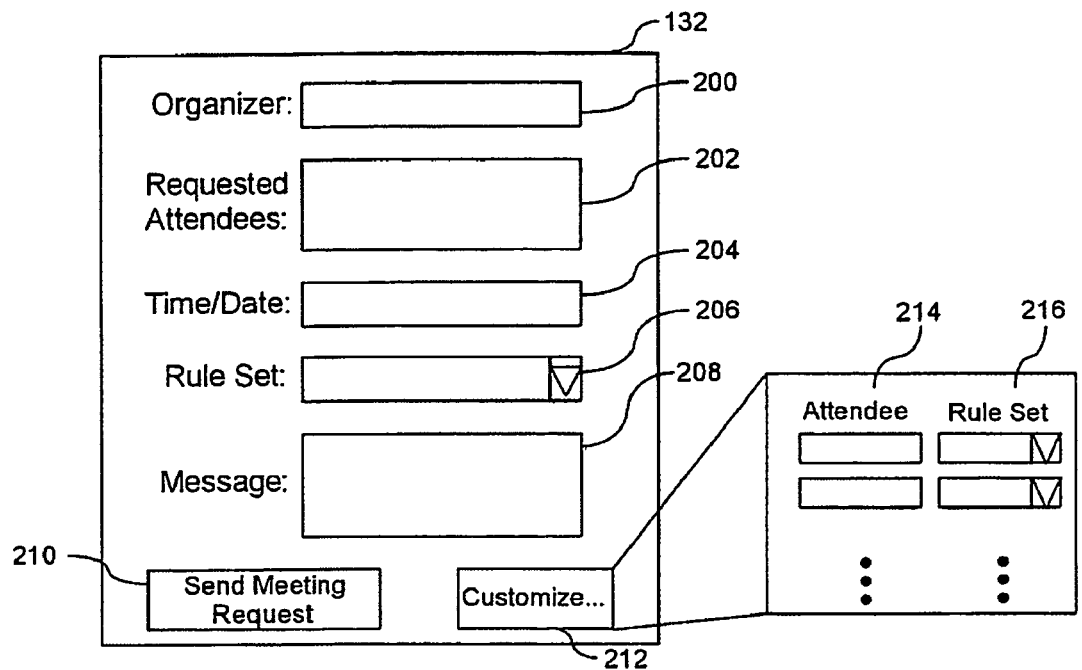
FIG. 7 is a schematic representation of the graphical user interface (GUI) shown in FIG. 6.

An exemplary GUI 132 is shown in greater detail in FIG. 7. The GUI 132 provides an entry box 200 for entering the name of the organizer of the meeting. The box 200 is populated with the name of the user interacting with the GUI 132 (e.g. the Manager) but may also allow a user to change the name of the organizer, e.g. when scheduled by a secretary or other employee on that user's behalf. An attendee entry box 202 allows a user to enter one or more requested attendees for the meeting (e.g. Employee A). A time/date option 204 allows the user to set the time and date for the meeting. The duration of the meeting will define a "restricted period" which represents a certain period of time where a lock is initiated for inhibiting certain features or services provided by the devices 24 and 164 in order to limit and/or control usage of the devices 24 and 164.

In the present example, the Manager may, for example, choose to hold a meeting between 2 pm and 5 pm on Monday. Consequently, a three hour restricted period is defined in which a set of rules is imposed on the devices belonging to the attendees of the meeting by initiating a lock. A rule set option 206 allows the Manager to select a pre-defined set of rules (defined by a rule set), or individual rules to impose during the meeting. For example, the Manager may wish to lock distracting features such as telephone and games options, but may allow an attendee to view mail in case an emergency arises. The effects of these rules will be explained in greater detail below. A message box 208 is also provided to enable the Manager to append a message to the meeting request 140a, such as a warning about the rules imposed or an agenda for the meeting. It will be appreciated that the features provided by the GUI 132, shown in FIG. 7 are for illustrative purposes only, and any number of variations may exist as desired.

The above features would typically impose a particular rule or rule set to all attendees listed in the attendee box 202. If the Manager wishes to apply different rule sets to different employees, a customize option 212 may be used instead. The customize option 212 includes a list of the attendees 214 and a rule set selector 216 for each attendee. Typically, the extent to which the rules can be applied is limited by the nature of the user's position within the employing entity. For example, the Manager may be allowed to impose any lock on Employee A, since Employee A (in this example) reports to the Manager. However, if the Manager was inviting an executive or vice president (not shown) to attend the meeting, e.g., as a speaker, they may not have permission to impose certain (or any) rules on such a user.

In these types of scenarios, the customize feature 212 allows the Manager to tailor the policy packets 144 to suit not only the nature of the meeting but also to accommodate permissions and any exceptional circumstances. For example, it may be known in advance that Employee A is expecting a very important email that they must acknowledge receipt of. In this case, the Manager can waive rules pertaining to viewing and sending mail, or may impose a conditional lock, which will be explained in greater detail below. Once the data is entered in the GUI 132, the user then chooses a send option 210, which will generate and send the meeting request 144a to the requested attendees. When sending a meeting request 144d over link 170, it will be appreciated that the options provided by GUI 132 are preferably available to the user in the lock program 168.

Figure 8:
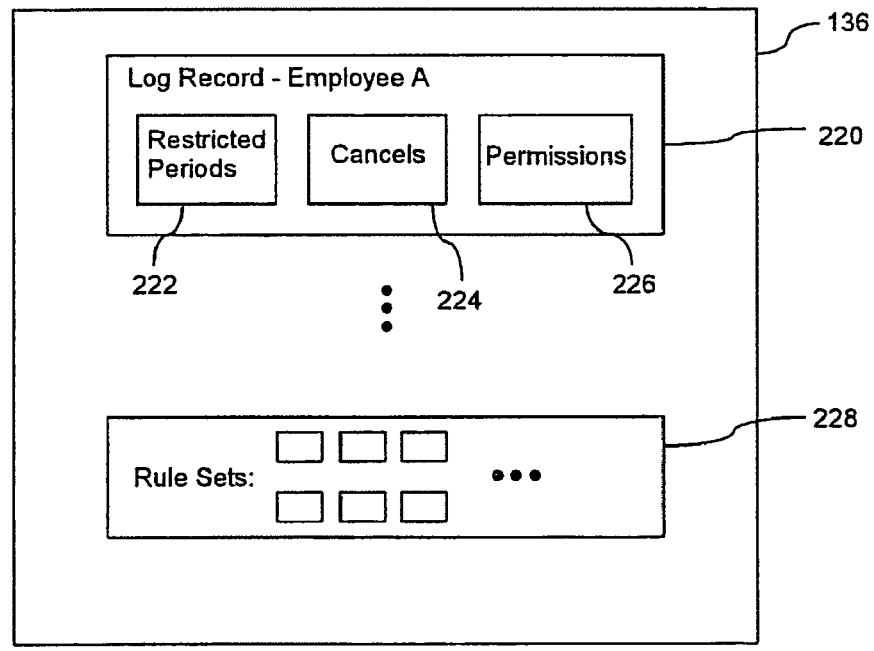
FIG. 8 is a schematic representation of the rules database shown in FIG. 6.

An example of the rules database 136 is shown in FIG. 8. The rules database 136 generally comprises device related data 228 and user related data 220. For example, the user related data 220 includes records 222 of restricted periods for Employee A, a record 224 of cancelled locks for Employee A, and a list 226 of permissions for Employee A. The permissions include a hierarchical tier indicating Employee A's relative position or seniority within the company. For example, if there are five (5) tiers and Employee A is in tier three (3), Employee A may set rules and thus be able to lock employees in tiers one (1) and two (2) and restrictively in tier three (3). However, in the case where generation of a meeting request 140a is delegated to another employee, there should be an option to enable a user to impose a lock on another user that is in a higher tier.

The device related data 228 includes a set of predefined rules and/or sets of rules that can be imposed on the devices 24, 164. For example, devices that include games can impose a games lock. Preferably, the administrator 130 governs the establishment of, and discretion for, creating and applying the rules. However, a manifestation of the rules database 136 may also be included or be accessible to the lock program 168 to enable a user (e.g. the Manager) to select or view the rule sets when generating a meeting request 140d and policy packet 144a.

The rule sets should be flexible and adaptable depending on the nature of the employing entity and the nature of the restricted period. For example, if a meeting request 140a is used by the Manager to schedule a social function, the rules should be more relaxed than those imposed during a meeting having a specially invited speaker. The rules should also be able to vary in degree throughout a restricted period, and thus different rule sets are applied for certain intervals within the meeting. For example, if a speaker is scheduled for the first 30 minutes, a strict set of rules may be applied for that interval and certain rules relaxed thereafter.

Figure 9:
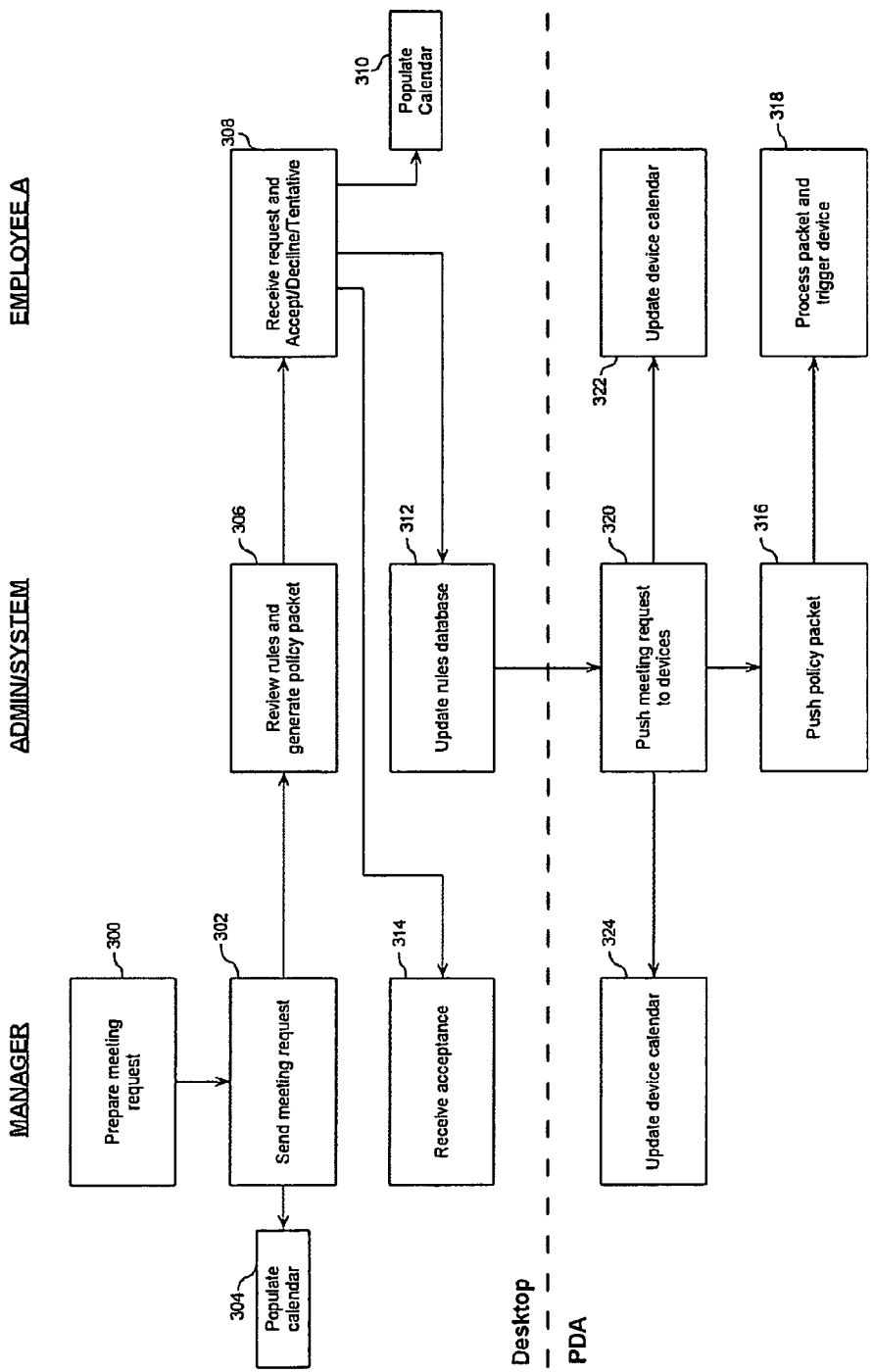
FIG. 9 is a flow chart showing the steps carried out in generating and pushing a policy packet from the administrator to the device in FIG. 6.

An exemplary method for pushing a policy packet 144 to device 24 for imposing a set of rules requested by the Manager using GUI 132 is shown in FIG. 9, making reference to FIGS. 6 and 7. In the example shown in FIG. 9, the Manager wishes to schedule a meeting with Employee A. The Manager first prepares a meeting request at step 300, by accessing GUI 132 and selecting the preferred criteria. For example, the organizer box 200 would indicate the Manager's name and optionally their title; the attendee box 202 would indicate Employee A and optionally their title; and the time/date option 204 would indicate a day and time for the meeting. Since the meeting includes only one attendee, the rule set option 206 can be used to select a rule set. Preferably, certain rule sets will include a minimum rule set plus other additional rules. For example, all meeting related requests can include a default lock on games 158, a default "silent" setting for phone 162, and other discretionary rules based on the permissions 226. The permissions 226 for the Manager and Employee A are preferably determined by the GUI 132 in order to tailor a rule set for the particular meeting. The rules database 136 is preferably accessed by the GUI 132 in order to obtain the user related data 220 pertinent to the selection of appropriate rules. Alternatively, the employing entity may impose a strict selection of rule sets that are automatically presented to the meeting organizer, based on the permissions 226 and the type of meeting request 140a.

At step 302, the meeting request 140a is sent to (or sent by) the administrator 130. When the meeting request 140a is sent, the Manager's calendar program 126 is populated with details of the meeting at step 304 and may include a notice indicating that certain features of the devices 24, 164 will be restricted during the meeting. The meeting request 140b, which represents a copy of the request 140a possessed by the administrator 130, is used by the administrator 130 to update the databases 136 and 138 and to generate a policy packet 144 that will be pushed to the device 24 at step 306.

In this example, another copy of the request 140c is received by Employee A through inbox 120 at step 308, and Employee A will choose to accept, decline, or tentatively accept the meeting request by making a selection in option 142. The meeting request 140c will preferably indicate to Employee A that certain functionality is restricted during this meeting. For the purpose of this example, Employee A accepts the meeting request 140c, and its calendar program 124 is updated at step 310. An indication that the meeting has been accepted (e.g. an acceptance message) is sent back to the administrator 130 at step 312 and a copy is sent back to the Manager at step 314.

Details of the meeting request are pushed to the devices 24 and 164 at step 320 using the principles outlined with respect to FIGS. 1-5 above. The Manager and Employee will then also have the meeting details available to them on their respective devices 164, 24 in order for them to view such details when they are away from their respective desktop computers 28, 26. The meeting details are added to the device calendars at steps 322 and 324. The meeting details will preferably include an indication that certain functionality will be disabled for the duration of the meeting. For example a "lock" icon may be displayed or a note including text that lists the functions that will be disabled. The lock icon may also be presented to the user prior to the time at which the rules are triggered in order to present a "lock reminder" to the user. This reminder is preferably implemented with a conventional calendar reminder that indicates that a meeting is forthcoming.

Preferably, Employee A and the Manager are provisioned a security key that is only known to them and the server 11. This key can be provided either in the meeting request 140a or 140c, or may be included in an initialization (not shown) that occurs prior to the meeting being scheduled. The security key is used to authenticate the policy packet pushed at step 316 to verify the validity of the request by the administrator 130 to lock certain features provided by the device 24. The packet 144a may also be validated in this way, thus the packets 144, 144a are preferably medium independent since in this case they are authenticated on the device 24 or 164.

The administrator 130 then also pushes the policy packet 144 generated in step 306 to the device 24 at step 316. The policy packet 144 is either pushed immediately upon generation of the meeting request, or is pushed at a later time, closer to the start time for the meeting or when Employee A confirms that they will be attending the meeting. Preferably, the policy packet 144 places a trigger within the device 24 that will automatically lock features based on the rules imposed when the restricted period begins. The trigger is placed in the device 24 at step 318. Preferably, the device 24 will first authenticate the packet 144 at step 318 to validate that the policies included in the packet come from a recognized entity (e.g. administrator 130 or Manager).

The device 24 then parses the commands included in the packet 144 which will indicate what features are to be inhibited. The commands may be conveyed in any manner that is suitable to the architecture employed by the device 24. For example, a list of services may be included in the packet with a Boolean "0" or "1" to indicate disable and enable respectively. Alternatively, the device 24 includes pre-existing knowledge of the rule sets 228 and the packet 144 then simply sends a profile identifier indicating which rule set will be applied. The pre-existing knowledge is obtained either when the device 24 is provisioned or at any other suitable time. For example, the commands included in the packet 144 are stored in a memory of the device 24, such as a database (not shown) and have respective unique identifiers associated therewith. A timer for the lock is registered with the operating system that is continually running. The identifier indicates what entry (including a set of commands) in the database is linked to a particular execution time. The operating system then provides a call back to check with the timer to see if it is within the restricted period, e.g., every 10 ms. If the timer indicates that it is within the restricted period then the commands related to the policy are initiated and, when the restricted period finishes, the timer de-registers itself with the operating system.

As noted above, the trigger will preferably include a warning prior to the meeting that certain rules will be imposed, in case Employee A is not attending the meeting and thus a lock on device 24 is not necessary. Such a warning is included in a routine reminder dialog that appears at a certain time prior to the meeting. This dialog allows Employee A to decline the meeting and thus cancel the lock. Also, the device 24 may be synchronized at desktop 26, which indicates that the device cannot be present in the meeting, in which case a lock on the device 24 is either unnecessary or inconsequential. In an alternative embodiment, the policy packet 144 may be sent at the time which the meeting reminder is provided. It will be appreciated that the policy packet 144 is sent at any suitable time prior to the commencement of the meeting and subsequent to the generation of the meeting request 140a.

Figure 11:
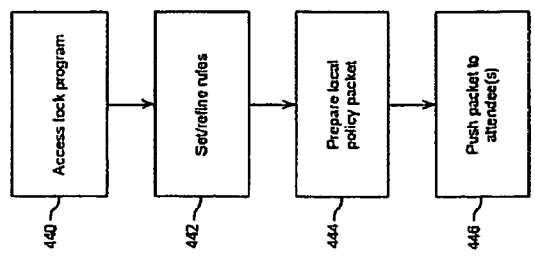
FIG. 11 is a flow chart showing an alternative method for pushing a policy packet to the device in FIG. 6.

In another example, a meeting organized by the Manager, and including Employee A takes place in an area that does not provide wireless coverage, and thus the devices 24 and 164 cannot access wireless gateway 20. It will be appreciated that the following principles are also applicable to generating and imposing policies in real-time and thus any entity may be employed for creating a policy to restrict or disable the usage of a device 24. In this example, the Manager selects only the minimum default lock, namely to lock games and phone during the meeting. If the Manager at some time during the meeting wishes to add a lock (e.g. conditional lock) for mail usage, they send an additional policy packet 144a as shown in FIG. 11. The Manager would first access the lock program 168 using their display 166 at step 440. The lock program 168 allows the Manager to push policies to Employee A without the need to synchronize with the desktops 26, 28 since access to the redirector software 12 is unavailable in this scenario. The lock program 168 preferably provides a version of the GUI 132 enabling the Manager to set and/or refine the parameters shown in FIG. 7 at step 442.

The device 164 would then prepare a local policy packet 144a at step 444 and push the packet 144a over link 170 to the device 24 at step 446. The packet 144a will then place a trigger in the device (or immediately trigger if done in real time) as discussed above and shown in FIG. 10. It will be appreciated that preferably, the Manager and Employee A are provisioned with a security key prior to the meeting in order for Employee A to authenticate packet 144a sent by the Manager. The lock program 168 therefore allows the Manager to remove, apply or revise the rule sets in real time during a meeting. This feature is applicable whether or not service is available to the devices 24, 164. Preferably, the packets 144a are able to be broadcast to multiple attendees at the same time, within a certain range of the device 164. Preferably, the devices 164 and 24 are also able to authenticate each other using cryptographic or other secure measures, e.g., certificates, digital signatures, etc.

In a variation of the above example, the Manager and Employee A spontaneously schedules a meeting without sending a prior meeting request. In this case, the Manager generates a meeting request 140d, which includes the opportunity to apply certain rules at that time. Alternatively, the Manager accesses the lock program 68 and proceeds with the steps set forth in FIG. 11.

Figure 10:
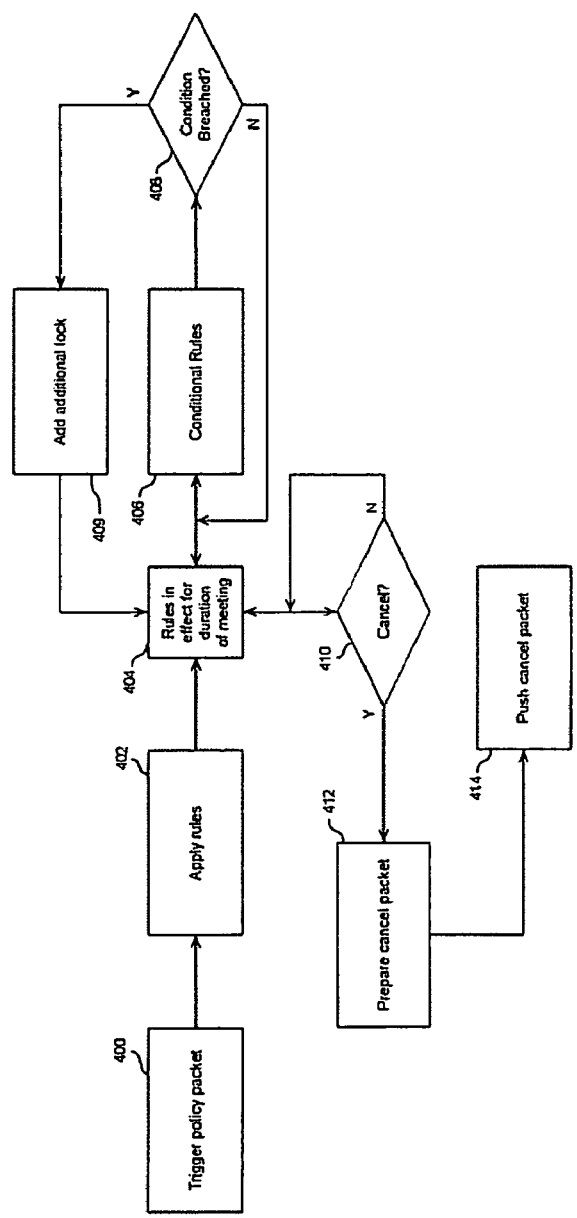
FIG. 10 is a flow chart showing the steps carried out in triggering the policy packet and applying a rule set for a duration of time to the device in FIG. 6.

An exemplary method for implementing a policy trigger on device 24 is shown in FIG. 10. As indicated above, preferably, the policy packet 144 is triggered in the device 24 at the time of the meeting. However, prior to triggering, a locking reminder is preferably presented to Employee A. At step 400, a warning dialog is presented on the display 150 for Employee A to confirm their attendance. If Employee A indicates that they are still planning to attend the meeting, the rules are applied at step 402. As shown in FIG. 6 and mentioned above, the games 158 and phone 162 features are locked for the duration of the meeting, and a conditional lock is placed on the send mail option 156.

In this example, the Manager has chosen a rule set that allows Employee A to send mail messages a limited number of times in order to allow Employee A to respond to a certain number of messages. As also shown in FIG. 6, Employee A preferably has unrestricted access to their inbox 154 (i.e. no lock has been placed on inbox 154). The conditional lock on the send mail option 156 allows the organizer of the meeting (e.g. the Manager) to place the onus on the attendee for triggering a lock on certain features of device 24. This allows the Manager to portray a sense of trust towards Employee A and allow for certain discretions in the case of important emails, but also to ensure that distracting behaviour can be limited or inhibited.

For example, during a two hour meeting, it would be reasonable to allow attendees to view their inbox and respond to a few (e.g. five or six) emails over the course of the meeting. In this case, a conditional lock allows the organizer to provide some flexibility, while restricting frequent messaging. Preferably, if a conditional lock is breached then a conditional breach packet 163 is pushed by the device 24 back to the administrator 130 to update the administration log 138.

At step 404, the rules imposed by the policy packet 144 are active for the duration of the meeting. However, as shown in FIG. 10, step 406 allows Employee A to use features within the defined conditional rules. The conditional rules would also typically include unlimited use of features that are not locked, such as the inbox 154 in this example. During conditional usage, the device 24 continually checks to see if any conditions have been breached at step 408. If use of the conditional feature is below a pre-determined threshold defined by the conditions, then the conditional usage resumes. However, if a conditional lock is breached, an additional lock is added at step 409 and step 404 continues. The additional lock would typically change the conditional restriction on the feature (e.g. send mail) to a full lock thus restricting any further use.

During step 404, another option is permitted, namely an option to cancel the lock 160. If the cancel option 160 is not selected, the rules 404 are maintained in force for the duration of the meeting. If the cancel option 160 is selected at step 410, a cancel indicator, such as cancel packet 161 is prepared at step 412 and the cancel packet 161 is pushed to the administrator 130 at step 414. It will be understood that the cancel option 160 should only apply to those features that can be unlocked according to the policies set by the employing entity. If default rules are implemented, certain features, e.g. games or cell phone, should remain locked despite any attempt to cancel the lock during a restricted period.

For example, Employee A may wish to step out of the meeting, leave early, or a break may occur. In such scenarios, Employee A continually has the option to cancel the lock and resume use of all functions offered by the device 24. As mentioned above, by selecting the cancel lock option 160, a cancel packet 161 is pushed back to the administrator 130. Certain cancel packets 161 may be expected during scheduled breaks, and may also be required during exceptional circumstances. In any case, the cancel packet 161 indicates to the administrator 130 that the lock was removed, and allows the administrator 130 to investigate further if necessary. Alternatively, a lock that has been triggered, relinquishes at certain predetermined intervals to accommodate scheduled breaks, e.g., lunch periods. The policy packets 144 may be tailored to offer such flexibility so as to minimize disruptions in service to the attendees while also minimizing distractions during the meeting.

Therefore, device usage can be monitored and the use of certain services or features restricted by pushing policy packets 144 from an administrator 130 to the device 24. The policy packets 144 impose a certain set of rules that "lock" certain features provided by the device, according to permissions and pre-established policies, for a certain period of time. Such restricted periods coincide with meetings or other events in which distractions should be kept to a minimum. Preferably, the rules include conditional locks that allow a user to use a feature a reasonable number of times before the lock is activated to place the onus on the user for minimizing such distractions, while enabling the user to maintain access to an often important communication tool. Moreover, the use of cancel packets 161, conditional packets 163, and the administration log 138 allows an administrator 130 to not only control but to monitor the application of the rule sets and when certain conditions are breached, which provides an employer with sufficient information to use in auditing device usage or in reprimanding users for misuse of a privilege such as the use of a mobile data communications device 24, 164.

Figure 12:
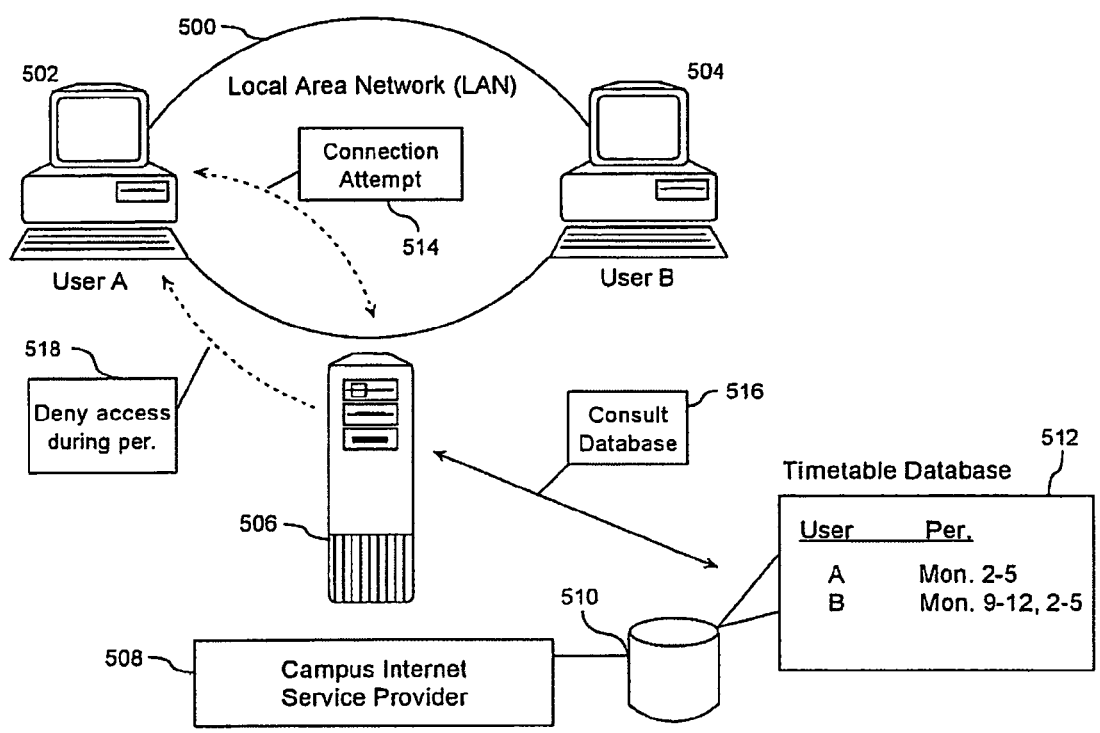
FIG. 12 is another embodiment of a system for controlling mobile device usage.

A further embodiment shown in FIG. 12 enables a service provider to restrict access to a service during restricted periods. In the embodiment shown in FIG. 12, users access a service through a network and the service provider controls access to and limits and/or monitors the period of time during which the service is provided. An Internet service is provided to a campus network 500, such as that provided at a university. The network 500 is embodied as a LAN and includes a first user operating a first computer 502 (hereinafter User A) and a second user operating a second computer 504 (hereinafter User B). Typically, the network 500 includes wireless access for laptops and other portable computing devices, and thus the computers 502, 504 are preferably laptop computers that may be used by User A and User B respectively when in the range of the wireless service. A campus Internet service provider 508 operates a server 506 for providing access to the Internet and other network resources. The provider 508 also controls access to the Internet. The provider 508 includes a data storage device 510 that includes a timetable database 512 that outlines restricted periods for User A and User B.

Typically, a student such as User A, has designated lecture periods, and has the option to use their laptop 502 for taking notes etc. However, often if a wireless network is present, User A is able to use instant messaging or browse the Internet during a lecture, which is often distracting to other participants in the same environment. Since the Internet service is provided to User A, is usually free of charge, the provider 508 often has the discretion to restrict Internet access during lecture periods. In order to do so, the provider 508 will typically have access to the timetable database 512. Certain measures should be taken to ensure privacy, e.g. by associating a timetable with a user ID that does not reveal the student's name. As shown in FIG. 12, when User A wishes to access the Internet, a connection attempt 514 is made with the server 506. The provider 508 consults the database 516 when a connection attempt 514 is made to determine if User A is scheduled to be in a lecture. If they are, the provider denies access 518 during that period.

In some cases, User A may be connected prior to the lecture, and thus could maintain their connection during the lecture. In such cases, the provider conducts a regular poll in order to determine if connections do exist, and then disconnects users during restricted periods. In other cases, User A that does not attend a lecture in order to work on another project may need Internet access in a lab or other room. Preferably, users will be able to exercise a cancel lock option (not shown) similar to that described with reference to FIG. 6. Alternatively, a user's location within the network 500 may be detectable through RF ID or through other detection means at local network access points, in which case a user's access may only be restricted if they are trying to connect to the network 500 from within the expected location of the lecture. Accordingly, rule sets are defined that can be exercised by the provider 508 to minimize unnecessary service interruption while also minimizing distractions and disruptions.

In another scenario, User A and User B are logged onto PCs 502 and 504 respectively in a computer lab. In this scenario the location of the PCs 502 and 504 is fixed, and, Internet usage as well as the use of other programs such as games can be inhibited in a manner similar to that described above with respect to FIG. 12. Accordingly, e.g., when User A is logged on during a schedule lab period, the service provider 508 is able to inhibit distracting behaviour by controlling the use of certain programs that are likely to cause a distraction.

In another embodiment, the devices 24 and 164 includes a GPS or other suitable location determining feature (not shown) for engaging and disengaging a lock that is imposed on the devices 24 and 164. For example, when Employee A enters a meeting room during a scheduled meeting, the device 24 (or a network connected detector, not shown) detects the presence of Employee A in the meeting and then initiates a policy packet 144. If the policy packet originates from the network 14, the packet is pushed through the redirector server software 12 as described above. If the device 24 itself triggers the lock, the device 24 imposes a default lock as also described above. In this example, when Employee A enters the meeting, features such as games and phone are disabled until they exit the meeting.

Likewise, if Employee A leaves a meeting prior to completion, such a change in location could be tracked in order to automatically disengage the lock without requiring Employee A to manually choose the cancel lock 160 option.

Accordingly, various implementations of the principles discussed above may be incorporated to include any suitable level of sophistication as desired by the employing entity. In the result, device usage may be controlled by any entity with the appropriate permissions to do so, for inhibiting distracting behaviour and to encourage only necessary usage of the device during particular restricted time periods.

Although the above has been described with reference to certain specific embodiments, various modifications thereof will be apparent to those skilled in the art as outlined in the appended claims.

What is claimed is:

1. A method for controlling usage of features provided by a device in a communication system, said features requiring user interaction, said method comprising:

said device obtaining a policy from another entity for controlling usage of particular features on said device during restricted periods, said policy being imposed by said another entity without input from a user of said device, said policy containing a set of rules for inhibiting access to a selected one or more of said particular features during said restricted periods, wherein application of said rules enables restriction of both local features not requiring a connection to said communication system and communication-based features requiring a connection to said communication system;

said device storing said policy in said device for referencing said rules to determine said selected one or more of said particular features to be restricted during said restricted periods;

said device determining a particular restricted period and a duration therefor;

upon commencement of said particular restricted period, said device referencing said set of rules in said policy and inhibiting access to said selected ones of said one or more of said particular features for the duration of said particular restricted period according to said rules;

during said particular restricted period, said device providing as an output on said device, an option to override one or more of said rules in said policy during said restricted period to thereby permit access to one or more of said selected ones of said particular features; and if said device detects an input to said device indicating that said option to override has been used, said device sending a cancel indicator to said another entity to enable said another entity to monitor usage of said device.

2. A method according to claim 1 further comprising said device authenticating said policy to validate the origin of said policy.

3. A method according to claim 1 wherein said policy is generated in response to a scheduled time period for a user of said device.

4. A method according to claim 1 wherein at least one of said set of rules is a conditional rule, said conditional rule allowing a conditional feature to be used a predetermined number of times during said particular restricted period, wherein if said predetermined number of times is exceeded, said conditional feature is disabled thereafter and a conditional indicator is provided to an administrator for monitoring said usage.

5. A method according to claim 1 wherein said policy is generated by an administrator at said another entity in response to a request to restrict the use of said device, said device being operated by said user, said request being sent to said user via said device and monitored by an administrator.

6. A method according to claim 5 wherein said administrator comprises a rules database, said policy being generated according to at least one rule set contained in said rules database.

7. A method according to claim 5 wherein said administrator monitors usage by updating an administration log.

8. A method according to claim 1 wherein said policy is generated by another user in response to a request thereby to inhibit said selected ones of said features, said request being sent to said device by said another user using another device.

9. A system for controlling usage of features provided by a device in a communication system, said features requiring user interaction, said system comprising:
   a) a communication subsystem for obtaining a policy from another entity for controlling usage of particular features on said device during restricted periods, said policy being imposed by said another entity without input from a user of said device, said policy containing a set of rules for inhibiting access to a selected one or more of said particular features during said restricted periods, wherein application of said rules enables restriction of both local features not requiring a connection to said communication system and communication-based features requiring a connection to said communication system;
   b) a memory for storing said policy in said device for referencing said rules to determine said selected one or more of said particular features to be restricted during said restricted periods; and
   c) computer executable instructions for:
      i) determining a particular restricted period and duration therefor;
      ii) upon commencement of said restricted period, referencing said set of rules in said policy and inhibiting access to said selected one or more of said particular features for the duration of said particular restricted period according to said rules;
      iii) during said particular restricted period, providing as an output on said device, an option to override one or more of said rules in said policy during said restricted period to thereby permit access to one or more of said selected ones of said features; and
      iv) if an input to said device is detected which is indicative that said option to override has been used, sending a cancel indicator to said another entity to enable said another entity to monitor usage of said device.

10. A system according to claim 9, said device and said another entity comprising a security key for use by said device to authenticate said policy.

11. A system according to claim 9 wherein said policy has been generated in response to a scheduled time period for said user of said device.

12. A system according to claim 9 wherein at least one of said set of rules is a conditional rule, said conditional rule allowing a conditional feature to be used a predetermined number of times during said particular restricted period, wherein if said predetermined number of times is exceeded, said conditional feature is disabled thereafter and a conditional indicator is provided to an administrator for monitoring said usage.

13. A system according to claim 9 wherein said policy has been generated by said another entity in response to a request to restrict the use of said device, said device being operated by said user, said request being sent to said user via said device and monitored by said another entity.

14. A system according to claim 9 further comprising a rules database, said policy being generated according to at least one rule set contained in said rules database.

15. A system according to claim 9 further comprising an administration log, wherein an administrator monitors usage by updating said administration log.

16. A system according to claim 9 wherein said another entity is another user having another device, said policy being generated by said another user in response to a request thereby to inhibit said selected ones of said features, said request being sent to said device by said another user.

17. A memory storing software program instructions for controlling usage of features provided by a device in a communication system, said software program instructions comprising instructions for:
   said device obtaining a policy from another entity for controlling usage of particular features on said device during restricted periods, said policy being imposed by said another entity without input from a user of said device, said policy containing a set of rules for inhibiting access to a selected one or more of said particular features during said restricted periods, wherein application of said rules enables restriction of both local features not requiring a connection to said communication system and communication-based features requiring a connection to said communication system;
   said device storing said policy in said device for referencing said rules to determine said selected one or more of said particular features to be restricted during said restricted periods;
   said device determining a particular restricted period and a duration therefor;
   upon commencement of said particular restricted period, said device referencing said set of rules in said policy and inhibiting access to said selected ones of said one or more of said particular features for the duration of said particular restricted period according to said rules;
   during said particular restricted period, said device providing as an output on said device, an option to override one or more of said rules in said policy during said restricted period to thereby permit access to one or more of said selected ones of said particular features; and
   if said device detects an input to said device indicating that said option to override has been used, said device sending a cancel indicator to said another entity to enable said another entity to monitor usage of said device.

18. A memory according to claim 17 further comprising instructions for having said device authenticate said policy to validate the origin of said policy.

19. A memory according to claim 17 wherein said policy is generated in response to a scheduled time period for a user of said device.

20. A memory according to claim 17 wherein at least one of said set of rules is a conditional rule, said conditional rule allowing a conditional feature to be used a predetermined number of times during said particular restricted period, wherein if said predetermined number of times is exceeded, said conditional feature is disabled thereafter and a conditional indicator is provided to an administrator for monitoring said usage.

21. A memory according to claim 17 wherein said policy is generated by an administrator at said another entity in response to a request to restrict the use of said device, said device being operated by said user, said request being sent to said user via said device and monitored by an administrator.

22. A memory according to claim 21 wherein said administrator comprises a rules database, said policy being generated according to at least one rule set contained in said rules database.

23. A memory according to claim 21 wherein said administrator monitors usage by updating an administration log.

24. A memory according to claim 17 wherein said policy is generated by another user in response to a request thereby to inhibit said selected ones of said features, said request being sent to said device by said another user using another device.

* * * * *